US007008270B1

(12) United States Patent  
Huh et al.

(10) Patent No.: US 7,008,270 B1  
(45) Date of Patent: Mar. 7, 2006

(54) CABLE CONNECTOR

(75) Inventors: Ben S. Huh, Granada Hills, CA (US); Mehrdad Ghara, Laguna Niguel, CA (US); Norbert Gibola, Laguna Niguel, CA (US); Monish J. Doshi, Irvine, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/999,776

(22) Filed: Nov. 30, 2004

(51) Int. Cl.
*H01R 13/24* (2006.01)

(52) U.S. Cl. ................................. 439/700; 439/745
(58) Field of Classification Search ............. 439/578, 439/700, 744, 745, 824, 289
See application file for complete search history.

(56) References Cited

U.S. PATENT DOCUMENTS

| | | | |
|---|---|---|---|
| 6,152,608 A * | 11/2000 | Ghara et al. ............... | 385/60 |
| 6,357,929 B1 * | 3/2002 | Roehrs et al. ............. | 385/59 |
| 6,572,273 B1 * | 6/2003 | Nguyen ..................... | 385/59 |
| 6,719,461 B1 * | 4/2004 | Cull .......................... | 385/71 |

* cited by examiner

*Primary Examiner*—Thanh-Tam Le
(74) *Attorney, Agent, or Firm*—David P. Wood

(57) ABSTRACT

A cable connector comprises a housing having a terminus receiving cavity that receives a terminus assembly. The cavity has a rearward facing shoulder and an annular recess defining a forward facing shoulder. The terminus assembly includes a terminus which is attached to the end of a cable. The terminus has rearward and forward facing shoulders, an annular recess rearward of the forward facing shoulder and a second forward facing shoulder rearward of the recess. The terminus assembly also includes a forward stop ring and a rearward lock ring slidably mounted on the terminus, and a coil spring biasing the rearward lock ring toward the first forward facing shoulder. A retention ring that is slideably mounted on the terminus behind the rearward lock ring has a rearward end engageable with the second forward facing shoulder of the terminus and a plurality of circumferentially spaced, cantilevered, depressible fingers having outwardly projecting lock tangs. The depressible spring fingers are engagable with the rearward lock ring to hold the lock tangs against the forward facing shoulder of the housing to retain the terminus assembly in the cavity.

12 Claims, 6 Drawing Sheets

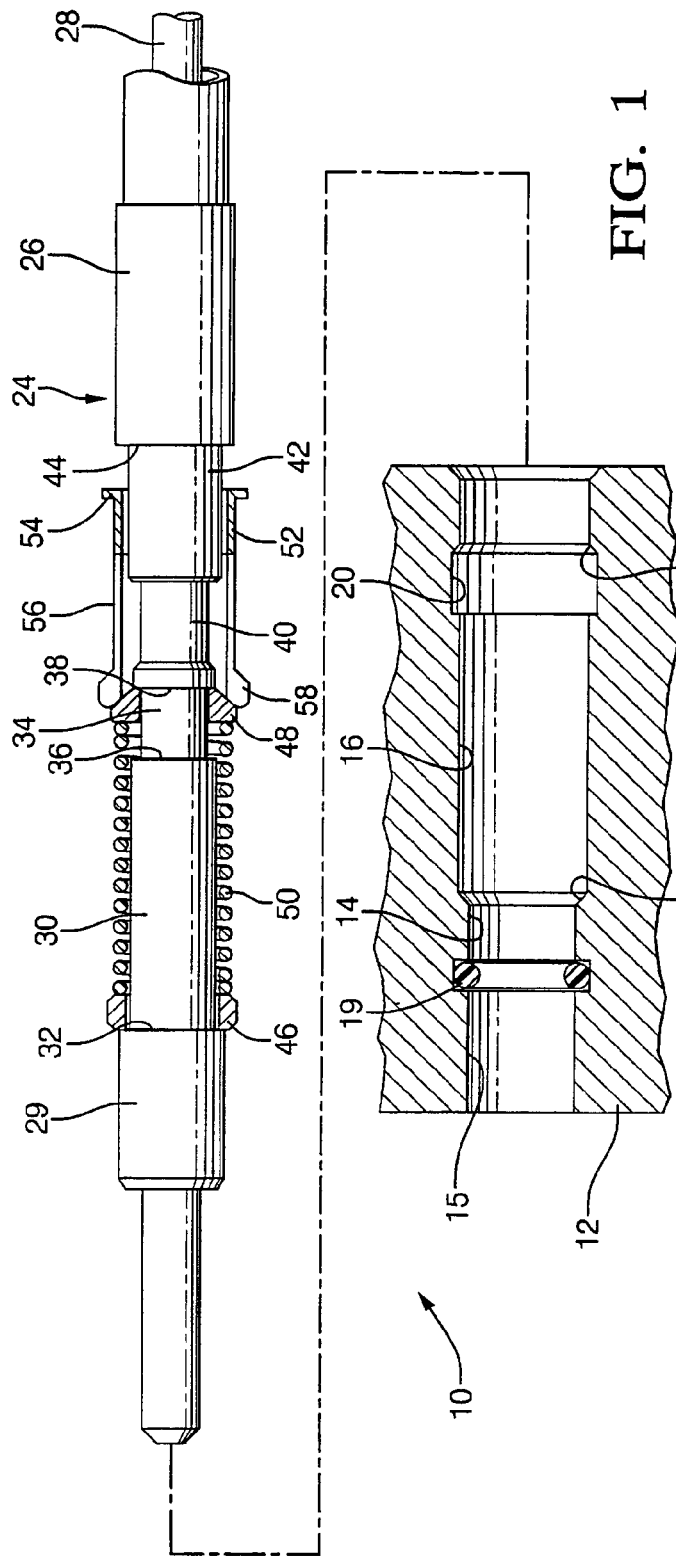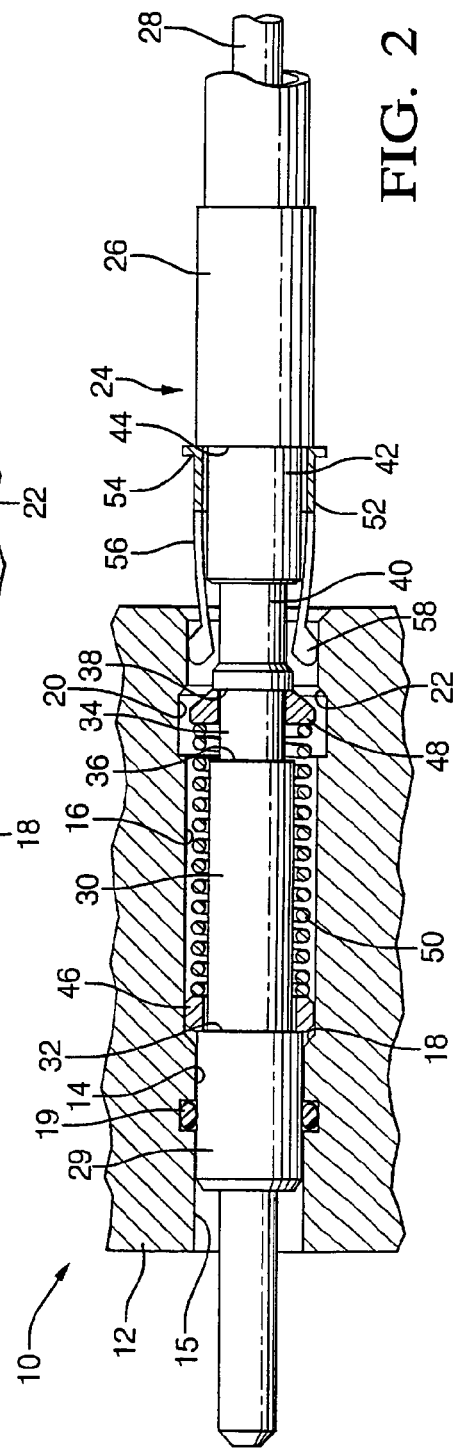

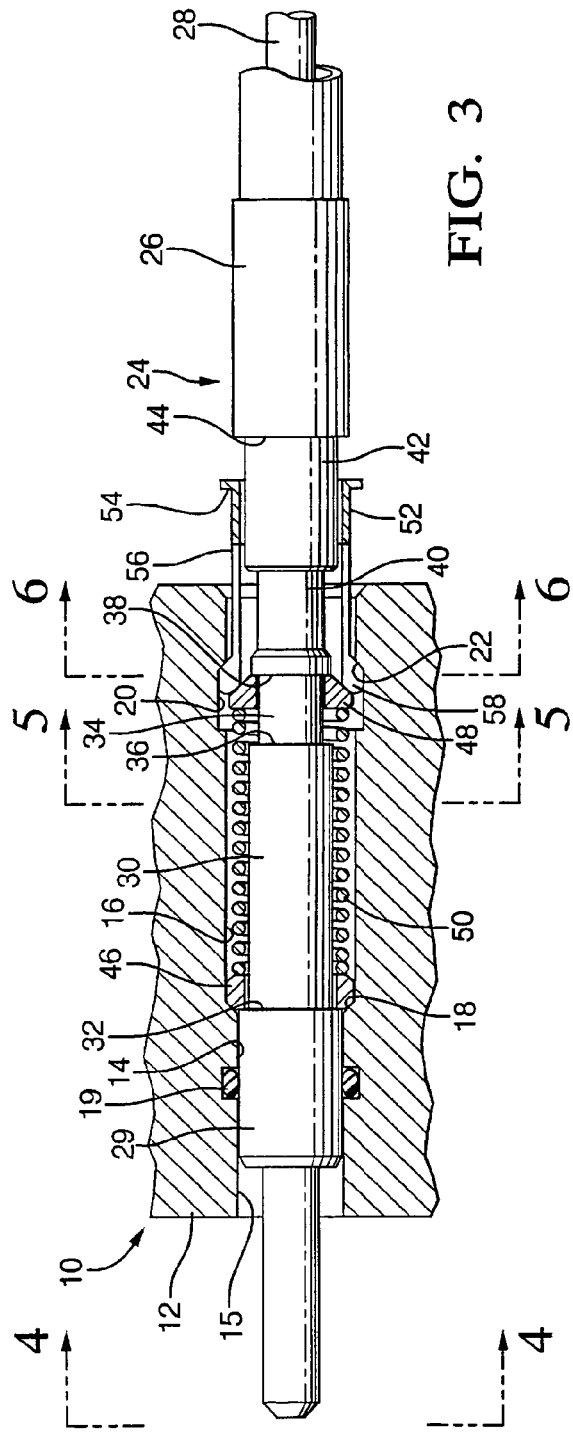
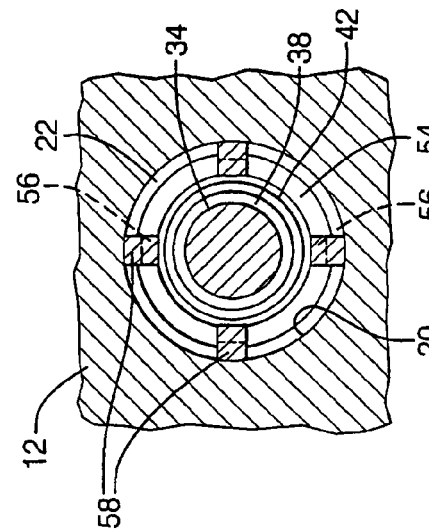
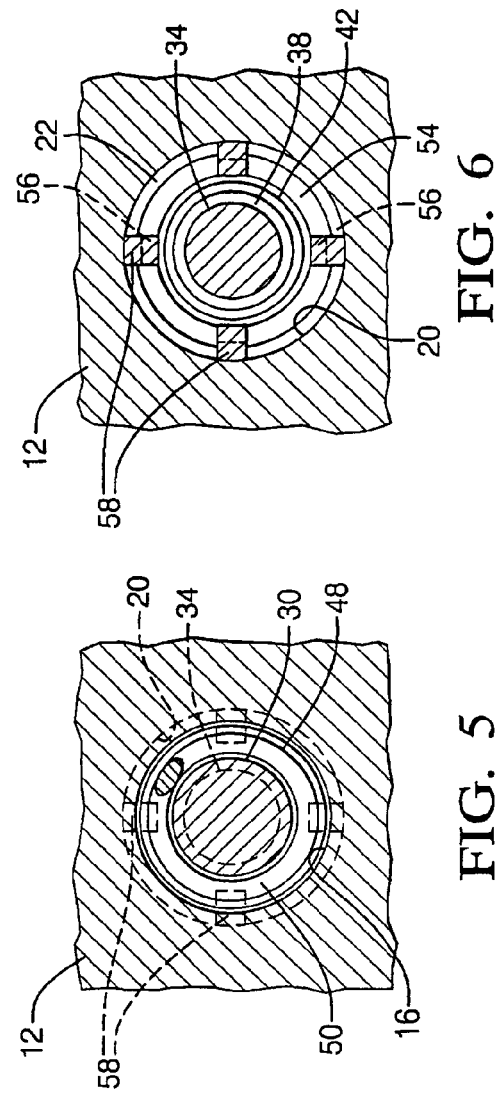
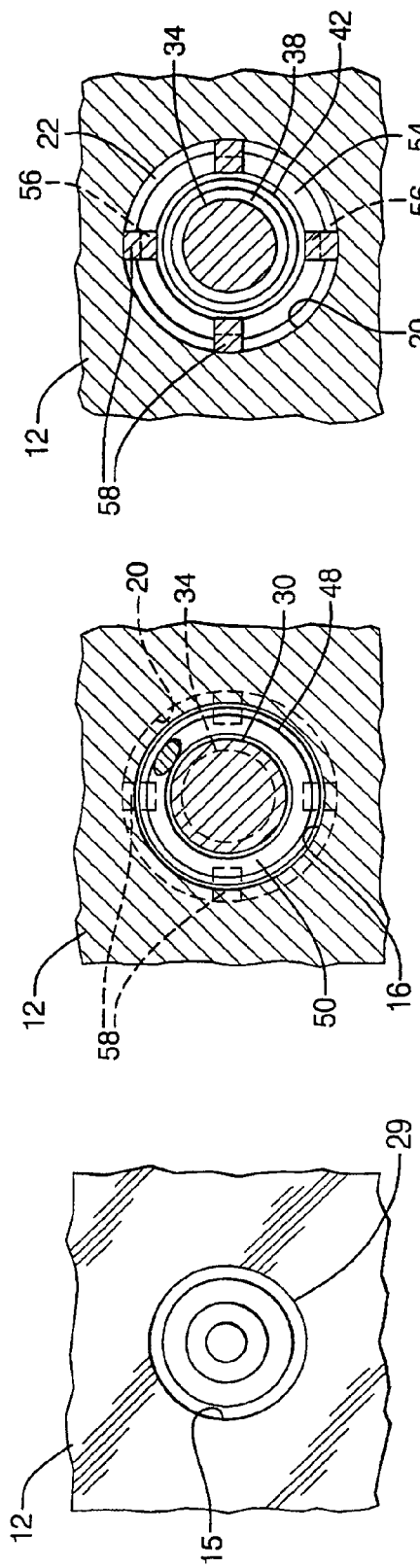

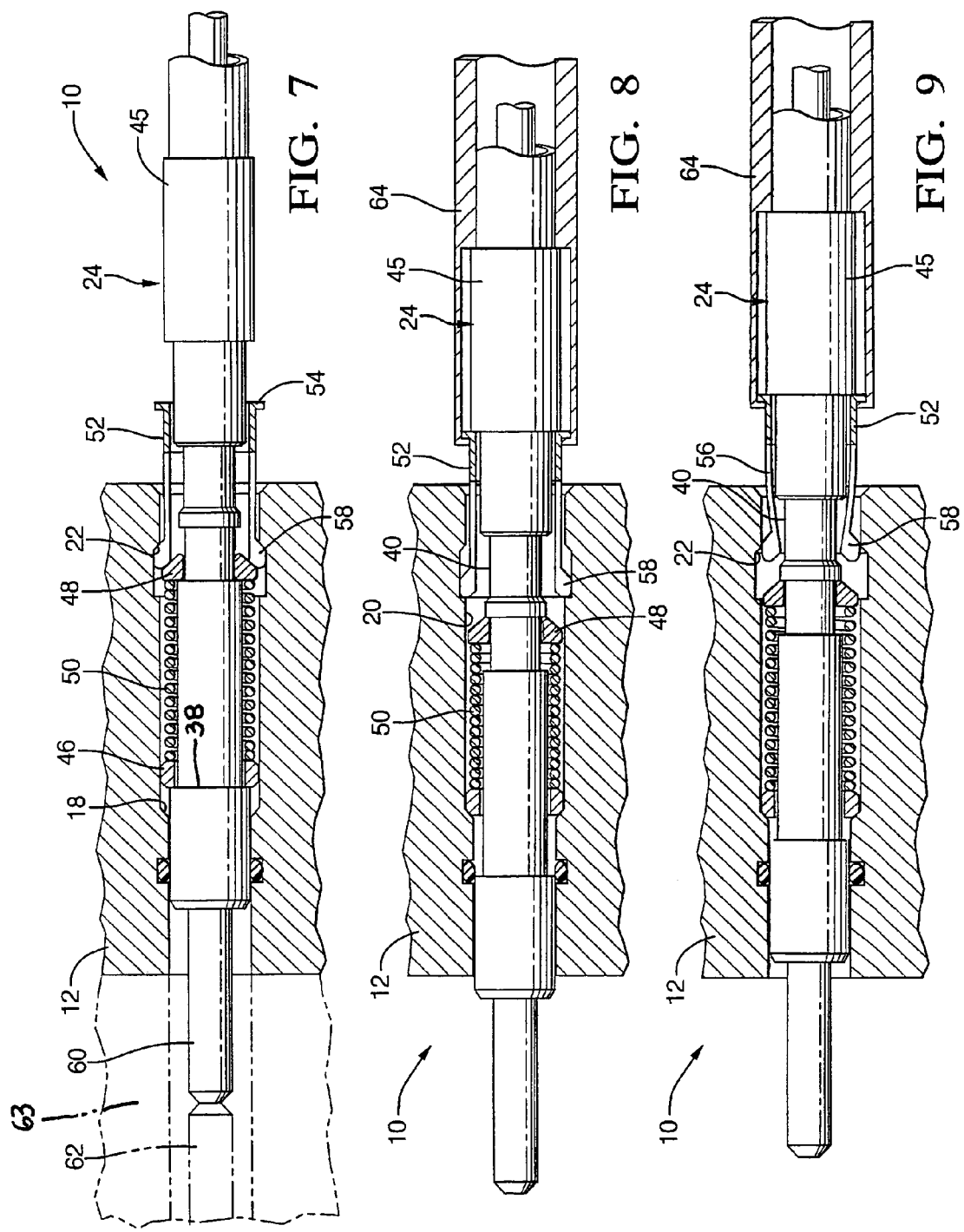

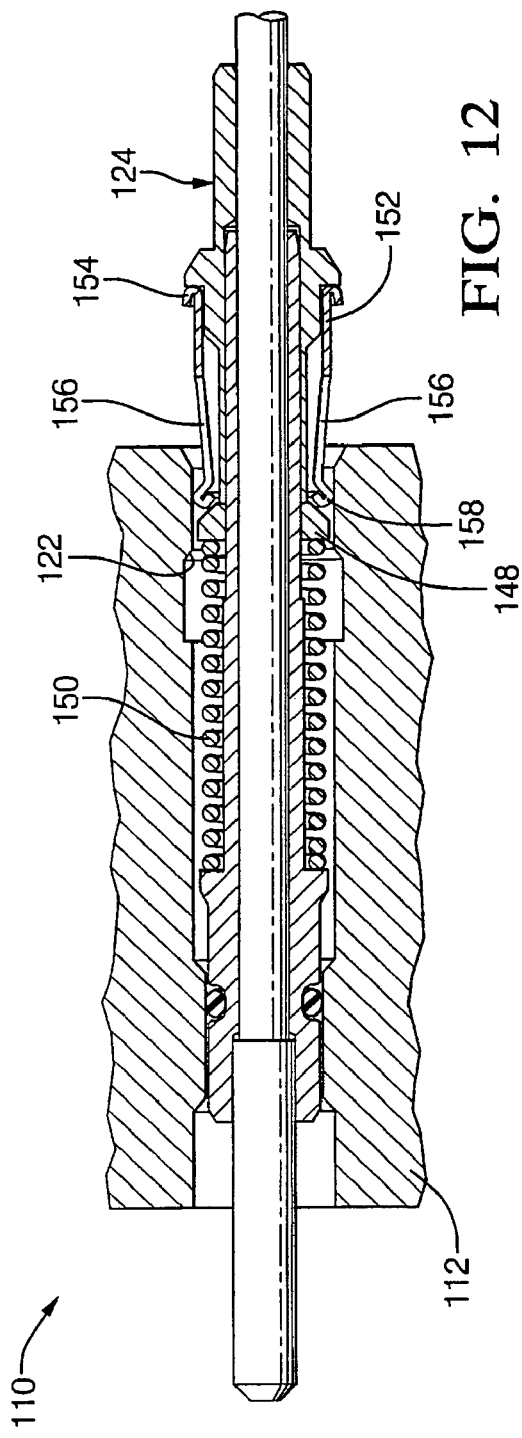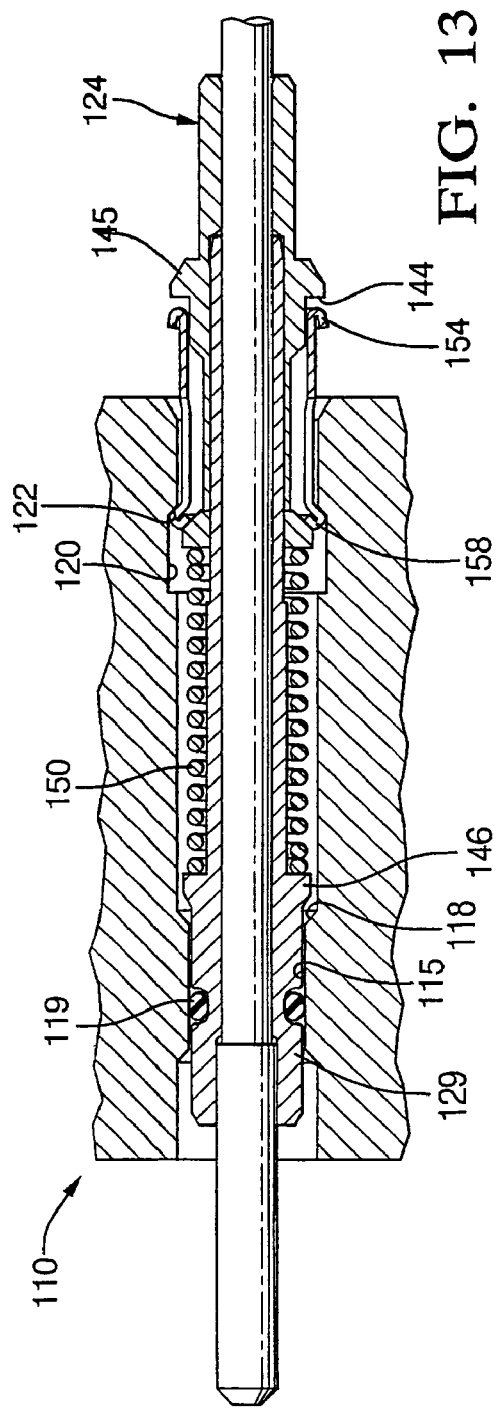

CABLE CONNECTOR

FIELD OF THE INVENTION

This invention relates to a cable connector comprising a housing having a terminus receiving cavity and a removable terminus assembly that that is attached to the end of a cable, such as a fiber optic or electric cable, and inserted into and retained in the cavity of the housing.

BACKGROUND OF THE INVENTION

A cable connector contains a terminus that is terminated onto an individual cable. The terminus is then inserted into a terminus receiving cavity in a housing that is coupled with a mating connector to create continuity for the cables in the respective housings. The terminus is removed and reinstalled several times for repair and/or servicing. Because of the need for several removals and installations, it is necessary to provide positive retention for the terminus assembly in the housing after installation as well as release of the terminus assembly when removal is required. Consequently there is a need to provide a cable connector having a terminal assembly that is installed and retained in a housing as well as removed easily.

SUMMARY OF THE INVENTION

The invention provides a cable connector comprising a housing and a terminus assembly that is received in a terminus receiving cavity extending through the housing from a rearward cable or insertion end to a forward end or contact end of the housing. The cavity has a rearward facing shoulder and an annular recess defining a forward facing shoulder spaced rearward of the rearward facing shoulder. The terminus assembly has a terminus attached to an end of a cable; the terminus having rearward facing and forward facing shoulders, an annular recess rearward of the forward facing shoulder and a second forward facing shoulder rearward of the recess. The terminus has a forward stop ring and a rearward lock ring that is slideably mounted on the terminus with a coil spring biasing the rearward lock ring toward the forward facing shoulder of the terminus. A retention ring that is slideably mounted on the terminus behind the rearward lock ring and engageable with the second forward facing shoulder of the terminus, has a plurality of circumferentially spaced, cantilevered, depressible spring fingers. The fingers have outwardly projecting lock tangs that are held against the forward facing shoulder of the housing by the rearward lock ring under the action of the coil spring to retain the terminus assembly in the housing. The spring fingers are depressed to free the lock tangs for removal of the terminus assembly.

BRIEF DESCRIPTION OF THE DRAWINGS

FIG. 1 is an exploded view of a cable connector embodying the invention with the housing and the terminus assembly of the cable connector shown in longitudinal section;

FIG. 2 is a longitudinal sectional view of the cable connector of FIG. 1 showing the terminus assembly in the process of being inserted into the cavity of the housing;

FIG. 3 is a longitudinal sectional view of the cable connector of FIG. 1 showing the terminus assembly fully inserted into the cavity of the housing;

FIG. 4 is a front view of the cable connector shown in FIG. 3;

FIG. 5 is a section taken substantially along the line 5—5 of FIG. 3 looking in the direction of the arrows;

FIG. 6 is a section taken substantially along the line 6—6 of FIG. 3 looking in the direction of the arrows;

FIG. 7 is a longitudinal sectional view of the cable connector of FIG. 1 showing the position of the terminus assembly when the cable connector is mated;

FIG. 8 is a longitudinal sectional view of the cable connector of FIG. 1 showing the terminus assembly in a process of removal;

FIG. 9 is a longitudinal sectional view of the cable connector of FIG. 1 showing the terminus assembly in a later stage in the process of removal;

FIG. 12 is a longitudinal sectional view of the cable connector of FIG. 10 showing the terminus assembly further in the process of being inserted into the cavity of the housing;

FIG. 13 is a longitudinal sectional view of the cable connector of FIG. 10 showing the terminus assembly fully inserted into the cavity of the housing.

DETAILED DESCRIPTION OF PREFERRED EMBODIMENTS

Figure 10:
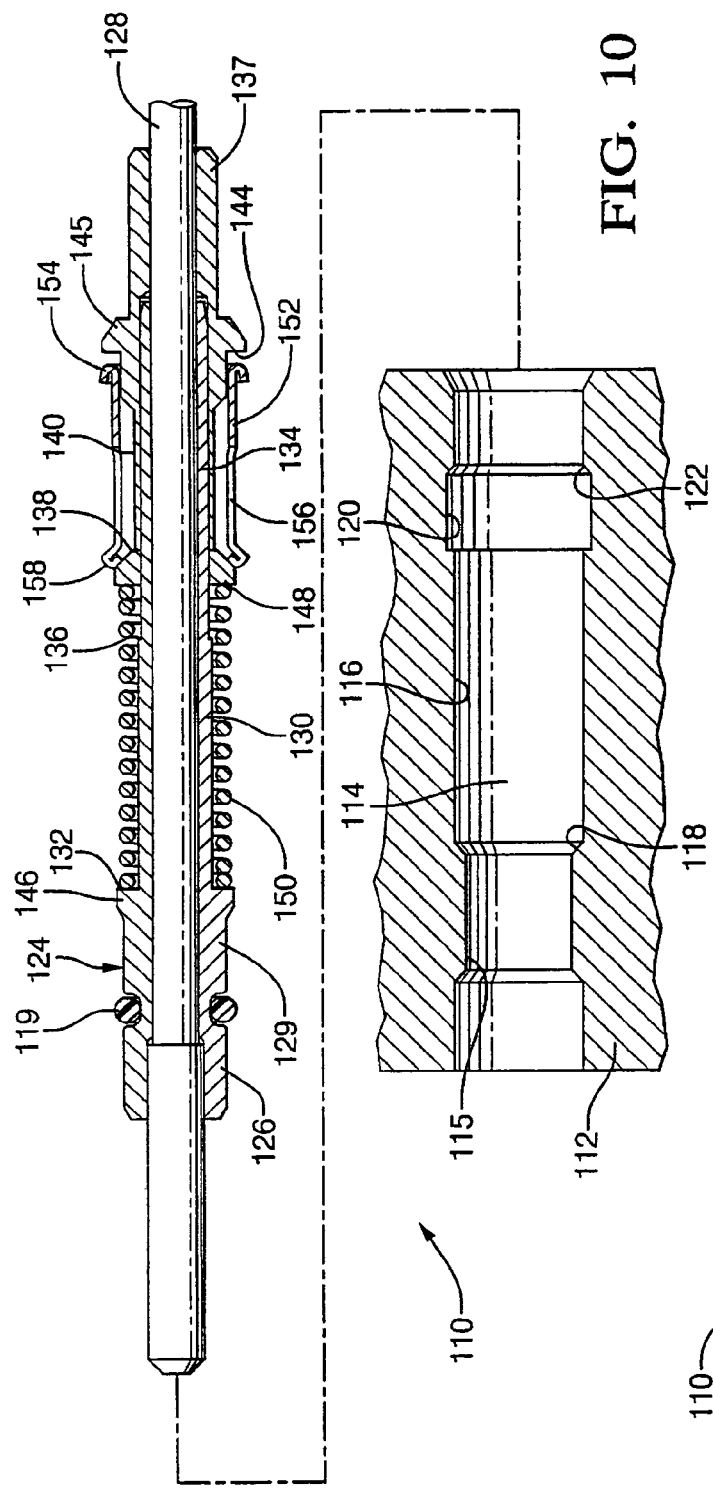
FIG. 10 is an exploded view of another cable connector embodying the invention with the housing and the terminus assembly of the cable connector shown in longitudinal section.

Referring now to the drawings and more particularly to FIG. 1, an exploded view of a cable connector 10 embodying the invention is illustrated with the housing 12 and terminus assembly 24 components shown in longitudinal section. The housing 12 has a terminus receiving cavity 14 extending through the housing from a rearward insertion or cable end (at the right end as shown in FIG. 1) to a forward mating or contact end of the housing (at the left end as shown in FIG. 1). Cavity 14 has a forward guide portion 15 and an enlarged rearward portion 16 defining a rearward facing shoulder 18. The forward guide portion 15 has an annular recess for a seal member, such as for example, an elastomeric O-ring seal 19, while the enlarged rearward portion 16 of the cavity 14 has an annular recess 20 defining an angled forward facing shoulder 22 spaced rearward of the rearward facing shoulder 18. The function of recess 20 is described below.

The terminus assembly 24 comprises a terminus 26 that is attached to an end of a cable 28, such as a fiber optic cable or an electric cable. It has a forward guide portion 29 followed by a compound slide section comprising a forward slide section 30 that has a reduced diameter to provide a first rearward facing shoulder 32. The forward slide section 30 is followed by an intermediate slide section 34 which has a second rearward shoulder 36 and a first forward facing shoulder 38 by reason of the intermediate slide section 34 having a diameter that is less than the reduced diameter of the forward slide section 30. An annular recess 40 is rearward of the intermediate slide section 34, and a rearward slide section 42 is rearward of the recess 40, the rearward slide section 42 having a second forward facing shoulder 44 provided by a rearward collar 45.

The terminus assembly 24 further comprises a forward stop ring 46 slidably mounted on the forward slide section 30, a rearward lock ring 48 slidably mounted on the intermediate slide section 34, and a resilient member such as, for example a coil spring 50, that biases the forward stop ring 46 against the first rearward facing shoulder 32 and the rearward lock ring 48 against the first forward shoulder 38 prior to insertion to the terminus assembly 24 into cavity 14 as shown in FIG. 1. In addition, the terminus assembly 24 has a retention ring 52 slideably mounted on the rearward slide section 42 of the terminus 26 behind the rearward lock ring 48. The retention ring 52 includes a rearward flange 54 engageable with the second forward facing shoulder 44 of the terminus 26 and a plurality of circumferentially spaced, cantilevered, depressible spring fingers 56 having outwardly projecting lock tangs 58. The rearward lock ring 48 engages the depressible spring fingers 56 biasing the lock tangs 58 outwardly against the forwarding facing shoulder 22 of the housing 12 when the forward stop ring 46 engages the rearward facing shoulder 18 of the housing 12 to retain the terminus assembly 24 in the cavity 16 in the installed position as shown in FIG. 3.

Terminus assembly 24 is installed in housing 12 by inserting the contact end (the left end as viewed in FIG. 2) of the terminus 26 in the insertion or cable end of the cavity 14 (the right end as viewed in FIG. 1). During installation, the lock tangs 58 engage the cavity 16 at the insertion end of the housing 12 depressing the lock tangs 58 and ends of fingers 56 radially inwardly as shown in FIG. 2. Upon further insertion, the forward stop ring 46 engages shoulder 18 whereupon, retention ring 52 is moved forward with respect to terminus 26. When the terminus assembly 24 is fully inserted with the retention ring 52 moved forward, the forward stop ring 46 engages shoulder 18 and the fingers 56 are urged outwardly by the spring biased lock ring 48 so that the lock tangs 58 are moved into recess 20 and biased against shoulder 22 as shown in FIG. 3. Connector 10 is now ready for mating. Thus the terminus assembly 24 is easily installed and retained in housing 12 simply by inserting the terminus assembly 24 into cavity 14 until the lock tangs 58 are biased against shoulder 22 by lock ring 48.

The terminus 26 acts like a spring biased plunger when the terminus assembly 24 is installed as shown in FIG. 3, allowing the projecting tip 60 to give longitudinally for spring biased engagement with contact 62 of a mating connector 63 shown in phantom in FIG. 7. This plunger action increases the compression of coil spring 50 which in turn increases the locking load of lock ring 48 biasing lock tangs 58 against the shoulder 22.

Terminus assembly 24 also preferably includes a continuity assurance feature in the form of a second rearward stop comprising rearward facing shoulder 36 and rearward lock ring 48. When rearward lock ring 48 engages and biases lock tangs 58 against shoulder 22 as shown in FIG. 3, pulling terminus 26 back by cable 28 is limited by this rearward stop, that is, by shoulder 36 engaging rearward lock ring 48 as shown in FIG. 7. Thus tip 60 always has at least a minimum projection as shown in FIG. 7. This minimum projection assures contact between tip 60 and contact 62 of mating connector 63, which in turn assures electrical or optical continuity from connector 10 to connector 63 depending on the type of cable that is being connected.

The terminus assembly 24 can be removed easily. To remove terminus assembly 24, cable connector 10 is disengaged from the mating connector 63 so that the internal parts of cable connector 10 resume the positions shown in FIG. 3. Terminus assembly 24 is now ready for removal from housing 12. For removal, terminus 26 is moved forward by a suitable tool 64 compressing spring 50, moving lock tangs 58 forward in recess 20 and freeing fingers 56 from lock ring 48 as shown in FIG. 8. Tool 64 now clamps retention ring 52 to the collar 45 of terminus 26. Retention ring 52 is then pulled back via flange 54 by tool 64 from the position shown in FIG. 8 to the position shown in FIG. 9 with coil spring 50 simultaneously pushing terminus 26 out. As the retention ring 52 is being moved back, lock tangs 58 are moved inwardly by the cam action of the angled lock shoulders 22 engaging the angled backs of the lock tangs 58 with the free ends of the fingers 56 being depressed into recess 40 of terminus 26. Once lock tangs 58 are free of shoulder 22, removal can be completed simply by pulling terminus assembly 24 completely out of cavity 14.

Referring now to FIG. 10, an exploded view of another cable connector embodying the invention is indicated generally at 110. Cable connector 110 illustrated with the housing 112 and terminus assembly 124 components shown in longitudinal section. The housing 112 has a terminus receiving cavity 114 extending through the housing from a rearward insertion end (at the right end as shown in FIG. 10) to a forward mating end of the housing (at the left end as shown in FIG. 10). Cavity 114 has a forward guide portion 115 and an enlarged rearward portion 116 defining a rearward facing shoulder 118. The enlarged rearward portion 116 of the cavity 114 has an annular recess 120 defining an angled forward facing shoulder 122 spaced rearward of the rearward facing shoulder 118. The function of recess 120 is described below.

The terminus assembly 124 comprises a terminus 126 that is attached to an end of a cable 128, such as a fiber optic cable or an electric cable. Terminus 126 has a forward guide portion 129 that has a fixed stop ring 146 at the end that is followed by a forward slide section 130 that has a reduced diameter to provide a first rearward facing shoulder 132. The forward section 130 is followed by an intermediate slide section 134 of still further reduced diameter to provide a second rearward facing shoulder 136. An end fitting 137 is pressed part way onto section 134. End fitting 137 provides a first forward facing shoulder 138 at the front end and a forward recess 140 of end fitting 137. Behind recess 140 is a rearward slide section 142, the rearward slide section 142 terminating at a second forward facing shoulder 144 provided by a collar 145 of end fitting 137.

The terminus assembly 124 further comprises a lock ring 148 slidably mounted on the intermediate slide section 134 for movement between shoulders 136 and 138. A resilient member, such as for example a coil spring 150, engages the first rearward facing shoulder 132 at one end and lock ring 148 at the opposite end and biases the lock ring 148 against the first forward shoulder 138 of terminus 126 prior to insertion to the terminus assembly 124 into cavity 114 as shown in FIG. 10. In addition, the terminus assembly 124 has a retention ring 152 slideably mounted on the rearward slide section 142 of the terminus 126 behind the lock ring 148. The retention ring 152 includes a rearward flange 154 engageable with the second forward facing shoulder 144 of the end fitting 137 that is part of terminus 126 and a plurality of circumferentially spaced, cantilevered, depressible spring fingers 156 having outwardly projecting lock tangs 158. The lock ring 148 engages the depressible fingers 156 biasing the lock tangs 158 outwardly against the forwarding facing shoulder 122 of the housing 112 to retain the terminus assembly 124 in the cavity 116 in the installed position as shown in FIG. 13.

Figure 11:
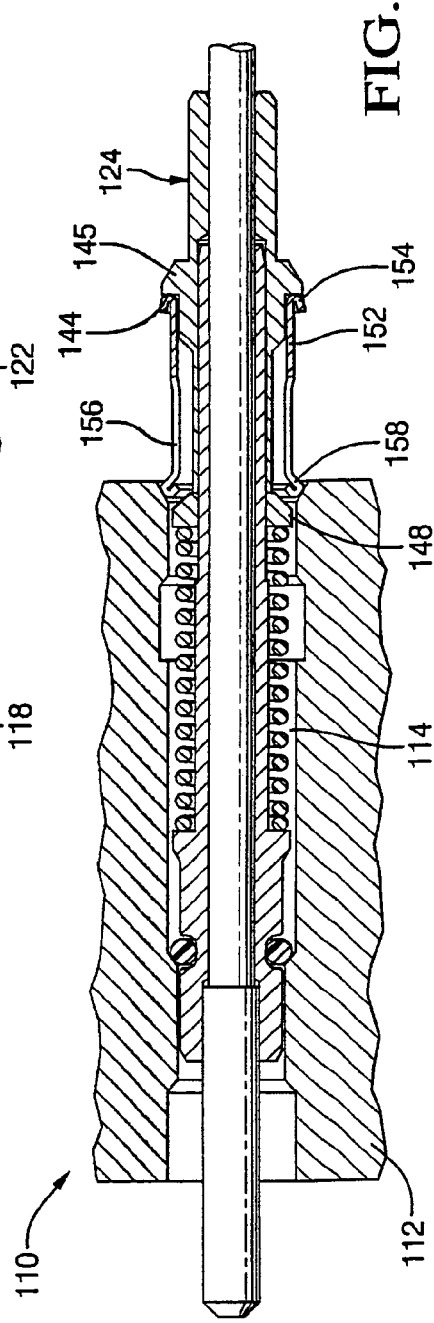
FIG. 11 is a longitudinal sectional view of the cable connector of FIG. 10 showing the terminus assembly in the process of being inserted into the cavity of the housing.

Referring now to FIGS. 11 and 12, terminus assembly 124 is installed in housing 112 by inserting the contact end (the left end as viewed in FIG. 11) of the terminus 126 in the insertion end of the cavity 114 (the right end as viewed in FIG. 11). During installation, the lock tangs 158 engage the insertion end of the housing 112 backing the retention ring 152 against shoulder 144 and the lock tangs 158 at the ends of fingers 156 away from lock ring 148 as shown in FIG. 11. Further insertion of terminus 126, depresses the ends of fingers 156 radially inwardly and moves retention ring 152 and lock ring 148 forward in cavity 116 as shown in FIG. 12. When the terminus assembly 124 is fully inserted, the lock tangs 158 enter recess 120 and are urged outwardly by the spring fingers 156 so that the lock tangs 158 are biased against shoulder 122. Terminus 126 is then released so that lock ring 146 applies the force of spring 150 to bias lock tangs 158 against shoulder 122 as shown in FIG. 13. When installed, terminus 126 has a small amount of spring biased end play in cavity 116 as indicated by the small gaps between stop ring 146 and shoulder 118 and between flange 154 and shoulder 144 of collar 145. Connector 110 is now ready for mating with another connector shown in phantom in FIG. 14.

Figure 14:
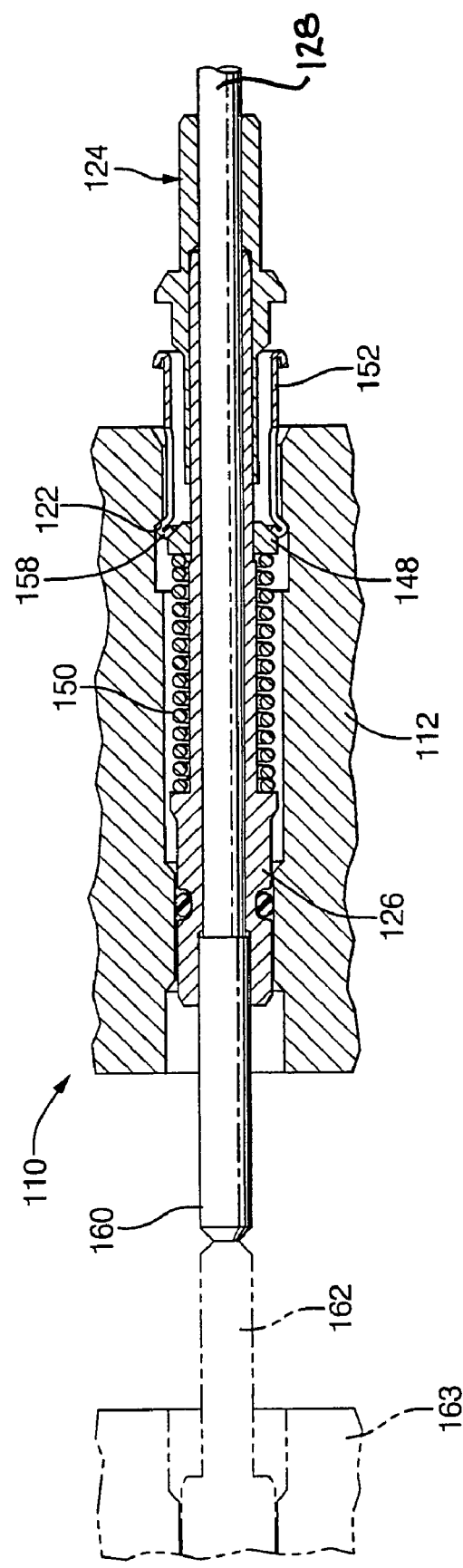
FIG. 14 is a longitudinal sectional view of the cable connector of FIG. 10 showing the position of the terminus assembly when the cable connector is mated.

The terminus 126 acts like a spring biased plunger when the terminus assembly 124 is installed as shown in FIG. 13, allowing the projecting tip 160 to give longitudinally for spring biased engagement with contact 162 of a mating connector 163 as shown in FIG. 14. This plunger action increases the compression of coil spring 150 which in turn increases the locking load of lock ring 148 that biases lock tangs 158 against shoulder 122.

The terminus assembly 124 can be removed easily. To remove terminus assembly 124, cable connector 110 is disengaged from the mating connector 163 so that the internal parts of cable connector 110 resume the positions shown in FIG. 13. Terminus assembly 124 is now ready for removal from housing 112. For removal, retention ring 152 is pulled back with the terminus 126 via flange 154 by the tool. As the retention ring 152 is pulled back, lock tangs 158 are moved inwardly by the cam action of the angled lock shoulder 122 engaging the angled backs of the lock tangs 158 with the free ends of the fingers 156 being depressed into recess 140 of terminus 126. Once lock tangs 158 are free of shoulder 122, removal is completed simply by pulling terminus assembly 124 completely out of cavity 114 via the position shown in FIG. 11.

Terminus assembly 124 also preferably includes a continuity assurance feature in the form of a second rearward stop comprising rearward facing shoulder 136 and rearward lock ring 148. When rearward lock ring 148 engages and biases lock tangs 158 against shoulder 122 as shown in FIGS. 13 and 14, pulling terminus 126 back by cable 128 is limited by this rearward stop, that is, by shoulder 136 (FIG. 10) engaging rearward lock ring 148. Thus tip 160 always has at least a minimum projection. This minimum projection assures contact between tip 160 and contact 162 of mating connector 163, which in turn assures optical continuity from connector 110 to mating connector 163 depending on the type of cable that is being connected.

Terminus assembly 124 is preferably sealed at the contact end by a seal member for example an elastomeric O-ring seal 119 that is seated in a groove in the forward guide portion 129 of terminus 126 and that engages cavity portion 115. This is an alternative to the sealing arrangement shown in the cable connector of FIGS. 1–9 where the seal member 19 is seated in a groove in the housing. Cable connectors 10 and 110 can use either sealing arrangement and in some instances, a sealing arrangement may not be necessary.

The cable connector 10 shown in FIGS. 1–9 is preferred where a heavier spring plunger force is desired. The cable connector shown in FIGS. 10–14 is preferred where a lighter spring plunger force is desired and a small spring biased end play can be tolerated.

While two cable connectors embodying the invention have been disclosed, many others are possible and various changes may be made without departing from the spirit or scope of the invention.

We claim:

1. A cable connector comprising:
   a housing having a terminus receiving cavity extending through the housing from a rearward insertion end to a forward contact end of the housing,
   the cavity having a rearward facing shoulder and an annular recess defining a forward facing shoulder spaced rearward of the rearward facing shoulder and
   a terminus assembly disposed in the terminus receiving cavity, the terminus assembly having a terminus attached to an end of a cable,
   the terminus having rearward facing and forward facing shoulders, an annular recess rearward of the forward facing shoulder and a second forward facing shoulder rearward of the recess,
   the terminus assembly having a lock ring slidably mounted on the terminus, and a coil spring biasing the lock ring toward the forward facing shoulder, and
   the terminus assembly having a retention ring slidably mounted on the terminus behind the lock ring, the retention ring being engageable with the second forward facing shoulder of the terminus and having a plurality of circumferentially spaced, cantilevered, depressible spring fingers having outwardly projecting lock tangs, the depressible fingers being engagable with the lock ring to hold the lock tangs against the forward facing shoulder of the housing.

2. The cable connector as defined in claim 1 wherein the retention ring has a rearward end engageable with the second forward facing shoulder of the terminus.

3. The cable connector as defined in claim 1 wherein retention ring has a rearward flange engageable with the second forward facing shoulder of the terminus.

4. The cable connector as defined in claim 2 wherein the terminus has a collar commencing at the second forward facing shoulder to assist in the removal of the terminus assembly by a tool adapted to clamp the retention ring to the collar.

5. The cable connector as defined in claim 3 wherein the terminus has a collar commencing at the second rearward shoulder to assist in the removal of the terminus assembly by a tool adapted to clamp the retention ring to the collar.

6. The cable connector as defined in claim 1 wherein:
   the cavity has an enlarged rearward portion defining the rearward facing shoulder, the enlarged rearward portion of the cavity has an annular recess defining the forward facing shoulder spaced rearward of the rearward facing shoulder, and
   the terminus has a forward slide section having the rearward facing shoulder, a second annular recess rearward of the forward slide section, and a rearward slide section rearward of the annular recess, the rearward slide section having the second forward facing shoulder, and
   the retention ring has a rearward end engageable with the second forward facing shoulder of the terminus.

7. The cable connector as defined in claim 1 wherein the terminus has a second rearward facing shoulder that is engaged by the lock ring to provide a minimum projection of the terminus with respect to the forward contact end of the housing.

8. The cable connector as defined in claim 6 wherein the terminus has a second rearward facing shoulder that is engaged by the lock ring to provide a minimum projection of the terminus with respect to the forward contact end of the housing.

9. A cable connector comprising:
   a housing having a terminus receiving cavity extending through the housing from a rearward insertion end to a forward contact end of the housing,
   the cavity having a rearward facing shoulder and an annular recess defining a forward facing shoulder spaced rearward of the rearward facing shoulder and
   a terminus assembly disposed in the terminous receiving cavity, the terminus assembly having a terminus attached to an end of a cable,
   the terminus having rearward facing and forward facing shoulders, an annular recess rearward of the forward facing shoulder and a second forward facing shoulder rearward of the recess,
   the terminus assembly having a forward stop ring and a rearward lock ring slidably mounted on the terminus, and a coil spring biasing the forward stop ring toward the rearward facing shoulder and the rearward lock ring toward the forward facing shoulder, and
   the terminus assembly having a retention ring slideably mounted on the terminus behind the rearward lock ring, the retention ring being engageable with the second forward facing shoulder of the terminus and having a plurality of circumferentially spaced, cantilevered, depressible spring fingers having outwardly projecting lock tangs, the depressible fingers being engagable with the rearward lock ring to hold the lock tangs against the forward facing shoulder of the housing.

10. The cable connector as defined in claim 9 wherein the terminus has a collar commencing at the second forward facing shoulder to assist in the removal of the terminus assembly by a tool adapted to clamp the retention ring to the collar.

11. The cable connector as defined in claim 9 wherein the forward stop ring is fixed with respect to the terminus.

12. The cable connector as defined in claim 9 wherein the forward stop ring as moveable with respect to the terminus.

* * * * *